US008565589B2

United States Patent
Okazaki

(10) Patent No.: US 8,565,589 B2
(45) Date of Patent: Oct. 22, 2013

(54) ZOOM TRACKING CONTROLLER, COMPOUND-EYE IMAGING APPARATUS, AND METHOD OF CONTROL BY ZOOM TRACKING CONTROLLER

(75) Inventor: Sakae Okazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 13/325,437

(22) Filed: Dec. 14, 2011

(65) Prior Publication Data

US 2012/0170921 A1 Jul. 5, 2012

(30) Foreign Application Priority Data

Jan. 5, 2011 (JP) .................................. 2011-000464

(51) Int. Cl.
*G03B 17/00* (2006.01)
(52) U.S. Cl.
USPC .......................................................... 396/77
(58) Field of Classification Search
USPC .......................................................... 396/77
See application file for complete search history.

(56) References Cited

U.S. PATENT DOCUMENTS

| 2012/0120303 | A1* | 5/2012 | Yamanaka ..................... 348/347 |
| 2012/0262595 | A1* | 10/2012 | Kishida et al. ............. 348/220.1 |
| 2013/0070124 | A1* | 3/2013 | Katsuyama et al. ....... 348/240.3 |

FOREIGN PATENT DOCUMENTS

JP 9-127400 5/1997

* cited by examiner

*Primary Examiner* — Clayton E Laballe
*Assistant Examiner* — Dennis Hancock
(74) *Attorney, Agent, or Firm* — Oblon, Spivak, McClelland, Maier & Neustadt, L.L.P.

(57) ABSTRACT

A zoom tracking controller includes a lens position acquiring unit that acquires the positions of a first zoom lens and a first focus lens, a cam curve storage unit that stores at least one reference cam curve, a normalizing unit that normalizes the acquired first zoom lens position and first focus lens position to a zoom lens position and a focus lens position on one of at least one reference cam curve according to a first cam curve and the reference cam curve, a focused lens position determining unit that determines second zoom lens and second focus lens positions on a second cam curve from the normalized zoom lens and focus lens positions according to the second cam curve and reference cam curve, and a lens controller that respectively moves the second zoom lens and second focus lens to the determined second zoom lens position and second focus lens position.

9 Claims, 16 Drawing Sheets

| CAM CURVE NUMBER | ZOOM LENS POSITION | FOCUS LENS POSITION |
|---|---|---|
| 0 | Pz[0][0] | Pf[0][0] |
| | Pz[0][1] | Pf[0][1] |
| | ⋮ | ⋮ |
| | Pz[0][255] | Pf[0][255] |
| 1 | Pz[1][0] | Pf[1][0] |
| | ⋮ | ⋮ |
| ⋮ | ⋮ | ⋮ |
| 31 | ⋮ | ⋮ |

| CAM CURVE NUMBER | MASTER-SIDE ZOOM LENS POSITION ADJUSTMENT VALUE |
|---|---|
| 0 | $\Delta mz[0]$ |
| 1 | $\Delta mz[1]$ |
| ⋮ | ⋮ |
| 31 | $\Delta mz[31]$ |

| CAM CURVE NUMBER | SLAVE-SIDE ZOOM LENS POSITION ADJUSTMENT VALUE | SLAVE-SIDE FOCUS LENS POSITION ADJUSTMENT VALUE |
|---|---|---|
| 0 | $\Delta sz[0]$ | $\Delta sf[0]$ |
| 1 | $\Delta sz[1]$ | $\Delta sf[1]$ |
| ⋮ | ⋮ | ⋮ |
| 31 | $\Delta sz[31]$ | $\Delta sf[31]$ |

ZOOM TRACKING CONTROLLER, COMPOUND-EYE IMAGING APPARATUS, AND METHOD OF CONTROL BY ZOOM TRACKING CONTROLLER

BACKGROUND

The present disclosure relates to a zoom tracking controller, a compound-eye imaging apparatus, and a method of control by the zoom tracking controller and, more particularly, to a zoom tracking controller that controls zoom tracking, a compound-eye imaging apparatus, and a method of control by the zoom tracking controller.

There is a demand for recently developed compound-eye imaging apparatuses, which capture images that can create a stereoscopic view, to control zoom tracking. Zoom tracking control is a type of control in which a zoom factor is changed while a focused state is maintained. Specifically, in zoom tracking control, a motor or the like moves a focus lens to a position at which a focus is obtained according to the movement of a zoom lens.

In zoom tracking control by a compound-eye imaging apparatus, a zoom lens and focus lens on the left side and a zoom lens and focus lens on the right side are controlled. For example, a proposed apparatus causes one of the zoom lenses on the right side and left side, which is referred to as the salve, to follow the movement of the other zoom lens, which is referred to as the master (see Japanese Patent Application Publication No. 9-127400, for example). This apparatus uses a differential amplifier and a comparator to detect a difference in position between the two zoom lenses as an error voltage. The apparatus moves the salve zoom lens in a direction in which the detected error voltage is reduced so that a match is obtained in focal length between the optical systems on the right side and left side. Thus, in this apparatus in the related art, the zoom lenses are positioned before the focus lenses on the right side and left side are moved under auto focus control to positions at which a focus is obtained.

SUMMARY

In the above technology described above, however, one of the optical systems on the right side and left side may defocus. The zoom lens and focus lens each have inherent error between their flange focal lengths and their corresponding designed values. The flange focal length is a distance from a surface at which a lens is mounted to an imaging device. If the zoom lens or focus lens has error in the flange focal length, a track representing a relationship among focused zoom lens positions and focus lens positions is displaced from a designed track. This track is referred to as the cam curve or zoom tracking curve. Since different lenses often have different flange focal length errors, the cam curve track on the master side may not match the cam curve track on the slave side. In spite of a discrepancy in the cam curve track between the master side and the slave side, if the positions of the focused zoom lens and focus lens on the master side are applied to the slave side without alteration, a focus may not be obtained on the slave side.

The apparatus described above controls the zoom lenses on the right side and left side so that a difference in the position between them is eliminated. However, there may be no match in the cam curve track between the master side and the slave side; in this case, even if the positions of the zoom lenses on the right side and left side are matched, the position of the focus lens at which a focus is obtained focuses differs between the right side and the left side. Therefore, one of the right and left optical systems may not focus, making it difficult to control tracking accurately.

It is desirable for a compound-eye imaging apparatus to perform accurate zoom tracking control easily.

According to an embodiment of the present disclosure, there are provided a zoom tracking controller and a method of control by the zoom tacking controller. The zoom tracking controller includes a lens position acquiring unit that acquires the positions of a first zoom lens and a first focus lens, a cam curve storage unit that stores at least one predetermined reference cam curve that represents a relationship among focused zoom lens positions and focus lens positions, a normalizing unit that carries out a normalizing process by which the acquired first zoom lens position and first focus lens position are normalized to a zoom lens position and focus lens position on one of at least one reference cam curve according to a first cam curve, which is specific to the first zoom lens and first focus lens, and to the reference cam curve, a focused lens position determining unit that determines the positions of a second zoom lens and a second focus lens on a second cam curve, which is a cam curve specific to the second zoom lens and second focus lens, from the normalized zoom lens position and focus lens position according to the second cam curve and the reference cam curve, and a lens controller that respectively moves the second zoom lens and second focus lens to the determined second zoom lens position and second focus lens position. In this way, the positions of the first zoom lens and first focus lens on the first cam curve are normalized, and the positions of the second zoom lens and second focus lens on the second cam curve are determined.

The normalizing unit in this embodiment may include a cam curve identifying unit that identifies one of the at least one reference cam curve according to the determined positions of the first zoom lens and first focus lens, an adjustment value storage unit that stores an adjustment value, which indicates a difference between a track of the first cam curve and a track of each of the at least one reference cam curve, and a normalization processing unit that carries out the normalizing process by using the adjustment value corresponding to the identified reference cam curve. In this way, the adjustment value is stored and used to execute the normalizing process.

The normalization processing unit in this embodiment can also create normalizing zoom information that indicates the normalized zoom lens position and normalized cam curve information that indicates the identified reference cam curve. The focused lens position determining unit in this embodiment can also determine the zoom lens position indicated in the normalized zoom information and the focus lens position corresponding to the zoom lens position indicted in the normalized zoom information on the reference cam curve indicated in the normalized cam curve information. In this way, the zoom lens position indicated in the normalized zoom information and the focus lens position corresponding to the zoom lens position are adjusted.

The lens controller in this embodiment may include a temperature compensating unit that compensates the determined second zoom lens position and second focus lens position according to the temperature characteristic of the compound-eye imaging apparatus to which the second zoom lens and second focus lens are attached, and may also has a lens driving unit that respectively moves the second zoom lens and second focus lens to the compensated second zoom lens position and second focus lens position. In this way, the second zoom lens position and second focus lens position are compensated according to the temperature characteristics of the compound-eye imaging apparatus.

The lens controller in this embodiment may further include an exposure compensating unit that compensates an exposure value according to the determined second zoom lens position. In this way, the exposure value is compensated according to the second zoom lens position.

This embodiment can also include a manipulation unit that changes the first zoom lens position according to a manipulation carried out by a user and a focus controller that, if the first zoom lens position is changed, analyzes an image formed by the first focus lens, and moves the first focus lens to a position at which the first focus lens is focused with the first zoom lens positioned at the changed position; the lens position acquiring unit can also acquire positions to which the first zoom lens and first focus lens have been moved by the focus controller. In this way, if the first zoom lens position is changed, the first focus lens is moved to a position at which the first focus lens is focused with the first zoom lens positioned at the changed position.

The focus controller in this embodiment may move the first zoom lens and a lens, used as a compensation lens, which compensates the amount of movement of the first focus lens with respect to the amount of movement of the first zoom lens on the first cam curve. In this way, the amount of movement of the focus lens with respect to the amount of movement of the first zoom lens.

According to another embodiment of the present disclosure, there is provided a compound-eye imaging apparatus that includes a first zoom lens, a first focus lens, a second zoom lens, a second focus lens, a lens position acquiring unit that acquires the position of the first zoom lens and the first focus lens, a cam curve storage unit that stores at least one predetermined reference cam curve that represents a relationship among focused zoom lens positions and focus lens positions, a normalizing unit that carries out a normalizing process by which the acquired first zoom lens position and first focus lens position are normalized to a zoom lens position and focus lens position on one of at least one reference cam curve according to a first cam curve, which is specific to the first zoom lens and first focus lens, and to the reference cam curve, a focused lens position determining unit that determines the positions of the second zoom lens and second focus lens on a second cam curve, which is a cam curve specific to the second zoom lens and the second focus lens, from the normalized zoom lens position and focus lens position according to the second cam curve and the reference cam curve, and a lens controller that respectively moves the second zoom lens and second focus lens to the determined second zoom lens position and second focus lens position. In this way, the positions of the first zoom lens and first focus lens on the first cam curve are normalized, and the positions of the second zoom lens and second focus lens on the second cam curve are determined.

A compound-eye imaging apparatus according to an embodiment of the present disclosure can accurately control zoom tracking with ease.

BRIEF DESCRIPTION OF THE DRAWINGS

FIG. 7 shows exemplary adjustment values on a master side in the embodiment.

FIG. 10 shows exemplary adjustment values on a slave side in the embodiment.

DETAILED DESCRIPTION OF EMBODIMENTS

Embodiments of this disclosure will be described below in the following order.
1. Embodiment (zoom tracking control: example of creating normalization information)
2. Another embodiment (zoom tracking control: example in which a compensation lens is added)

1. Embodiment

Structure of a Compound-Eye Imaging Apparatus

Figure 1:
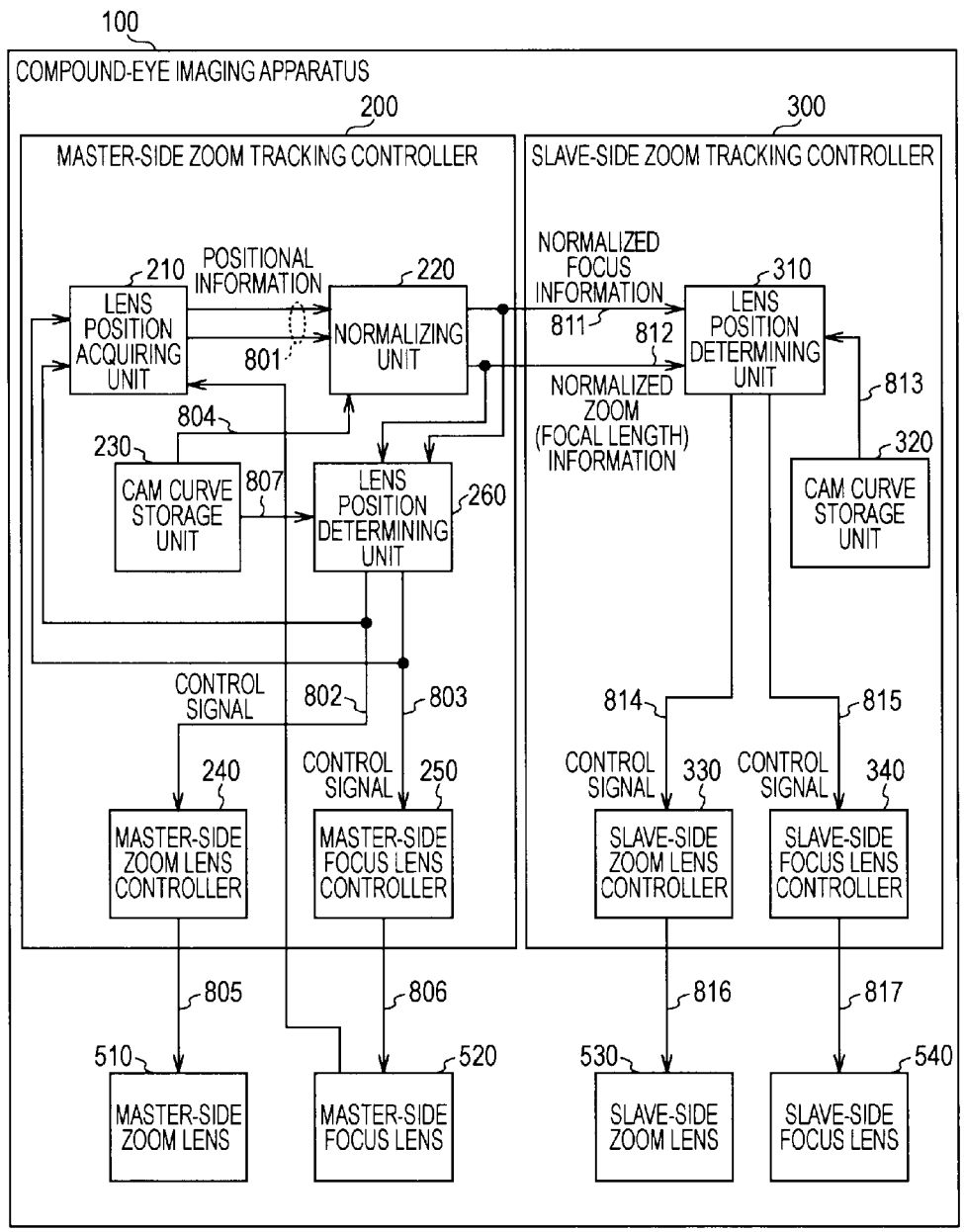
FIG. 1 is a block diagram showing an example of the structure of a compound-eye imaging apparatus in an embodiment of the present disclosure.

FIG. 1 is a block diagram showing an example of the structure of a compound-eye imaging apparatus 100 in an embodiment of the present disclosure. The compound-eye imaging apparatus 100 includes a master-side zoom tracking controller 200 and a slave-side zoom tracking controller 300. The compound-eye imaging apparatus 100 also includes a master-side zoom lens 510, a master-side focus lens 520, a slave-side zoom lens 530, and a slave-side focus lens 540.

The master-side zoom tracking controller 200 controls zoom tracking in an optical system on the master side. The master-side zoom tracking controller 200 includes a lens position acquiring unit 210, a normalizing unit 220, a cam curve storage unit 230, a master-side zoom lens controller 240, a master-side focus lens controller 250, and a lens position determining unit 260.

The slave-side zoom tracking controller 300 controls an optical system on the slave side by following zoom tracking control on the master side. The slave-side zoom tracking controller 300 includes a lens position determining unit 310, a cam curve storage unit 320, a slave-side zoom lens controller 330, and a slave-side focus lens controller 340.

To change the focal length of the master-side zoom lens 510, its position is controlled by the master-side zoom tracking controller 200.

To determine the focal position of the master-side focus lens 520 on an imaging device, the position of the master-side focus lens 520 is controlled by the master-side zoom tracking controller 200.

To change the focal length of the slave-side zoom lens 530, its position is controlled by the slave-side zoom tracking controller 300.

To determine the focal position of the slave-side focus lens 540 on an imaging device, the position of the slave-side focus lens 540 is controlled by the slave-side zoom tracking controller 300.

The lens position acquiring unit 210 obtains the positions of the master-side zoom lens 510 and master-side focus lens 520, and outputs positional information indicating the positions of the master-side zoom lens 510 and master-side focus lens 520 to the normalizing unit 220 through a signal line 801.

The cam curve storage unit 230 stores at least one reference cam curve having a predetermined track. The reference cam curve is used as a reference by the master-side zoom tracking controller 200 when it normalizes the position of each lens. Exemplary reference cam curves are cam curves of an ideal zoom lens and focus lens, which have no error between their flange focal lengths and their corresponding designed values. When a plurality of reference cam curves are stored, a plurality of focal lengths are determined, for example. One reference cam curve is stored in the cam curve storage unit 230 for each local length.

The normalizing unit 220 normalizes the positions of the master-side zoom lens 510 and master-side focus lens 520, which are indicated in the positional information, to a zoom lens position and focus lens position on the reference cam curve.

Normalizing is to replace a position on a cam curve having a different track than the reference cam curve with a position on the reference cam curve. When the normalizing unit 220 outputs a normalized result, it suffices for the normalizing unit 220 to output only one of the replaced focus lens position and zoom lens position; both of them are not output. This is because if one of the zoom lens position and focus lens position is determined, the other is consequently determined.

Specifically, the normalizing unit 220 identifies one of the reference cam curves received from the cam curve storage unit 230 thorough a signal line 804, on the basis of the positional information. For example, the normalizing unit 220 compares minimum distances between a point indicated in the positional information and all reference cam curves and identifies the smallest minimum distance.

The normalizing unit 220 then normalizes each point in the positional information to a position on the reference cam curve. For example, adjustment values are determined in advance that indicate differences between tracks specific to the cam curves of the master-side zoom lens 510 and master-side focus lens 520 and the track of each reference cam curve. The normalizing unit 220 performs normalization by using an adjustment value in a calculation for the position of the master-side zoom lens 510 indicated in the positional information. The adjustment values are measured before, for example, shipment. Even after the shipment, the adjustment values may be updated at the replacement or repair of a lens.

The normalizing unit 220 creates normalization information used to indentify the focus lens position and zoom lens position, which have been obtained through normalization as described above. The normalization information includes normalized focus information and normalized zoom (focal length) information. The normalized focus information indicates an identified reference cam curve. Since a focal length has been defined for each reference cam curve, a focal length can be determined from the relevant reference cam curve. The normalized zoom (focal length) information indicates a normalized zoom lens position. The normalizing unit 220 outputs the normalized focus information to the lens position determining unit 310 and lens position determining unit 260 through a signal line 811. The normalizing unit 220 also outputs the normalized zoom (focal length) information to the lens position determining unit 310 and lens position determining unit 260 through a signal line 812.

The lens position determining unit 260 determines the positions of the master-side zoom lens 510 and master-side focus lens 520 on the track of the cam curve specific to the master side from the normalized zoom lens position and focus lens position. Specifically, the lens position determining unit 260 receives the normalized focus information and normalized zoom (focal length) information from the normalizing unit 220. The lens position determining unit 260 then acquires the reference cam curve indicated in the normalized focus information from the cam curve storage unit 230 through a signal line 807. The lens position determining unit 260 acquires, from the reference cam curve, the focus lens position corresponding to the zoom lens position indicated in normalized zoom (focal length) information. The lens position determining unit 260 uses an adjustment value to determine positions on the track of the cam curve specific to the maser side from the zoom lens position indicated in the normalized zoom (focal length) information and the acquired focus lens position. For example, adjustment values are determined in advance that indicate differences between tracks specific to the curves of the master-side zoom lens 510 and master-side focus lens 520 and the track of each reference cam curve. The lens position determining unit 260 determines positions on the track of the cam curve specific to the master side by using these adjustment values in calculations for the positions of the zoom lens and focus lens. The lens position determining unit 260 outputs a control signal, to the master-side zoom lens controller 240 and lens position acquiring unit 210 through a signal line 802, that commands the movement of the master-side zoom lens 510 to the determined zoom lens position. The lens position determining unit 260 also outputs a control signal, to the master-side focus lens controller 250 and lens position acquiring unit 210 through a signal line 803, that commands the movement of the master-side focus lens 520 to the determined focus lens position.

The master-side zoom lens controller 240 controls the position of the master-side zoom lens 510 in response to the control signal received from the lens position acquiring unit 210 through the signal line 802.

The master-side focus lens controller 250 controls the position of the master-side focus lens 520 in response to the control signal received from the lens position acquiring unit 210 through the signal line 803.

The cam curve storage unit 320 stores at least one reference cam curve. Specifically, the cam curve storage unit 320 stores at least one reference cam curve identical to a reference cam curve stored in the cam curve storage unit 230 on the master side. The normalizing unit 220 performs normalization on the basis of a reference cam curve that is stored in both the cam curve storage unit 230 on the master side and the cam curve storage unit 320 on the slave side.

The lens position determining unit 310 determines the positions of the slave-side zoom lens 530 and slave-side focus lens 540 on the track of the cam curve specific to the slave side from the normalized zoom lens position and focus lens position. Specifically, the lens position determining unit 310 receives the normalized focus information and normalized zoom (focal length) information from the normalizing unit 220. The lens position determining unit 310 then acquires the reference cam curve indicated in the normalized focus information from the cam curve storage unit 320 through a signal line 813. The lens position determining unit 310 acquires, from the reference cam curve, the focus lens position corresponding to the zoom lens position indicated in normalized zoom (focal length) information. The lens position determining unit 310 uses the adjustment values to determine positions on the track of the cam curve specific to the slave side from the zoom lens position indicated in the normalized zoom (focal length) information and the acquired focus lens position. For example, adjustment values are determined in advance that indicate differences between tracks specific to the curves of the slave-side zoom lens 530 and slave-side focus lens 540 and the track of each reference cam curve. The lens position determining unit 310 determines positions on the track of the cam curve specific to the slave side by using these adjustment values in calculations for the positions of the zoom lens and focus lens. The lens position determining unit 310 outputs a control signal, to the slave-side zoom lens controller 330 through a signal line 814, that commands the movement of the slave-side zoom lens 530 to the determined zoom lens position. The lens position determining unit 310 also outputs a control signal, to the slave-side focus lens controller 340 through a signal line 815, that commands the movement of the slave-side focus lens 540 to the determined focus lens position.

The slave-side zoom lens controller 330 controls the position of the slave-side zoom lens 530 in response to the control signal received from the lens position determining unit 310 through the signal line 814.

The slave-side focus lens controller 340 controls the position of the slave-side focus lens 540 in response to the control signal received from the lens position determining unit 310 through the signal line 815.

The master-side zoom tracking controller 200 and slave-side zoom tracking controller 300 described above are examples of the zoom tracking controller according to an embodiment of the present disclosure. The slave-side zoom lens controller 330 and slave-side focus lens controller 340 described above are also examples of the lens controller according to the embodiment. The normalized focus information described above is also an example of the normalized cam curve information according to the embodiment.

Figure 2:
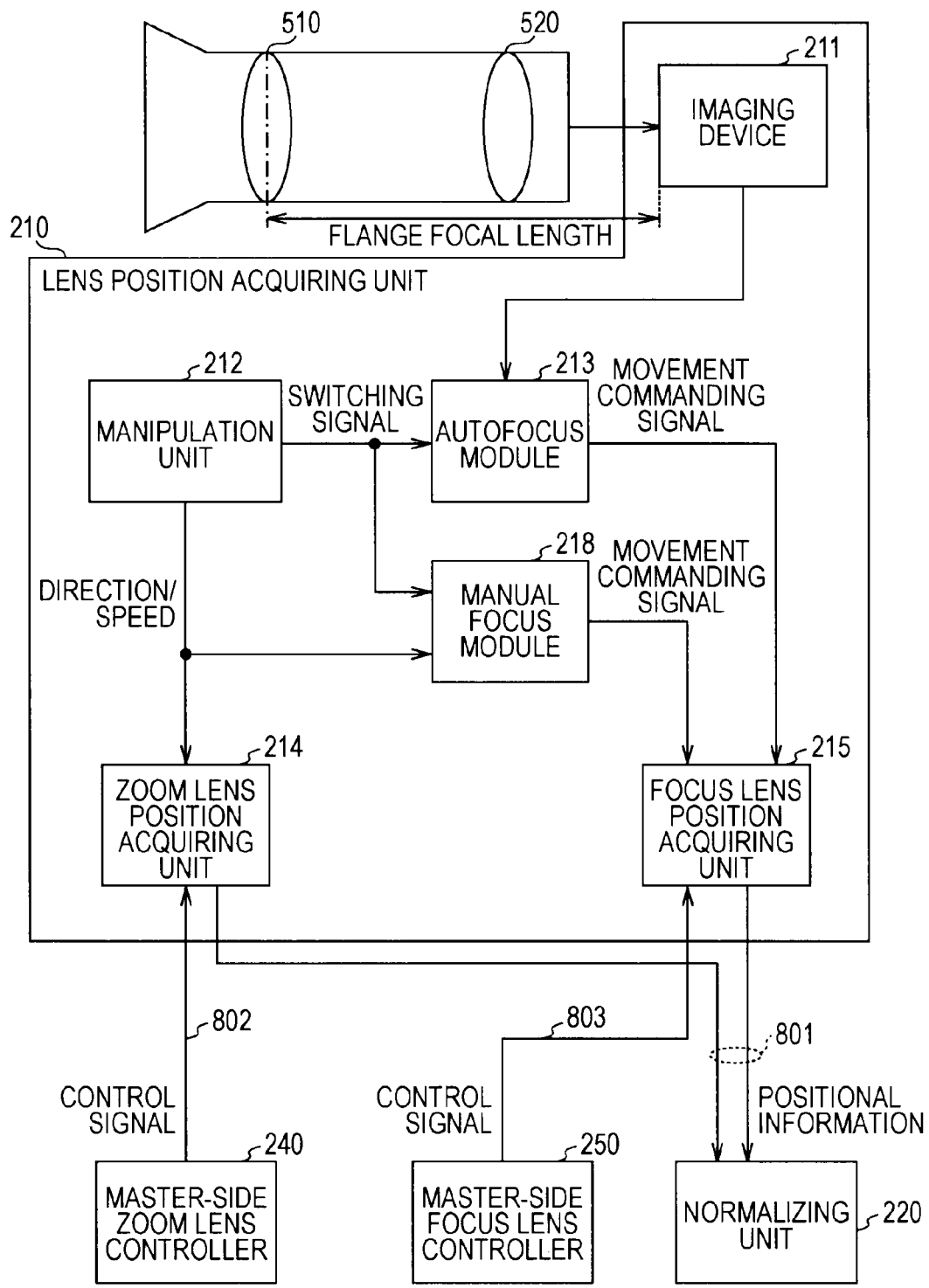
FIG. 2 is a block diagram showing an example of the structure of a lens position acquiring unit in the embodiment.

FIG. 2 is a block diagram showing an example of the structure of the lens position acquiring unit 210 in this embodiment. The lens position acquiring unit 210 includes an imaging device 211, a manipulation unit 212, an autofocus module 213, a zoom lens position acquiring unit 214, a focus lens position acquiring unit 215, and a manual focus module 218.

The imaging device 211 converts light incident through the master-side zoom lens 510 and master-side focus lens 520 into an electric signal and then outputs the converted electric signal to the autofocus module 213.

As shown in FIG. 2, in an optical column, the master-side focus lens 520 is disposed close to the imaging device 211 and the master-side zoom lens 510 is disposed close to a subject. A focus is obtained by moving these lenses. The method in which the focus lens and zoom lens in an optical column are controlled to obtain a focus is generally referred to as the inner-focus method. The distance from the surface on which a lens is attached to the imaging device 211 is called the flange focal length.

The manipulation unit 212 generates manipulation signals, which control the zoom lens and focus lens, in response to manipulations carried out by the user. For example, the manipulation signals control the directions in which to move the zoom lens and focus lens and the speeds at which to move these lenses. The manipulation unit 212 outputs the generated manipulation signals to the zoom lens position acquiring unit 214 and manual focus module 218. When the user manipulates the manipulation unit 212 to change manual focus control to auto focus control, the manipulation unit 212 outputs a switching signal, which indicates whether focus control is auto focus control or manual focus control, to the autofocus module 213 and manual focus module 218 in response to the manipulation.

When a switchover to manual focus control is made, the manual focus module 218 generates a movement commanding signal that commands a destination to which to move the focus lens, in response to the manipulation signal from the manipulation unit 212. The manual focus module 218 then outputs the generated movement commanding signal to the focus lens position acquiring unit 215.

The autofocus module 213 moves the master-side focus lens 520 to a position at which a focus is obtained when a switchover to auto focus control is made. The autofocus module 213 acquires image data from, for example, the electric signal output from the imaging device 211 and analyzes the image data. When the focus lens is moved, high-frequency components in image data are usually distributed in a mountain-like shape with the focus point at a peak. The autofocus module 213 analyzes the image and moves the master-side focus lens 520 to the position corresponding to this peak. This focus method is generally referred to as the climbing method. The autofocus module 213 outputs, to the focus lens position acquiring unit 215, a movement commanding signal that commands the movement of the focus lens to a point at which a focus is obtained.

The zoom lens position acquiring unit 214 acquires the position of the master-side zoom lens 510. Specifically, upon receipt of a manipulation signal output from the manipulation unit 212, the zoom lens position acquiring unit 214 acquires the position of the master-side zoom lens 510 according to a control signal from the master-side zoom lens controller 240. The zoom lens position acquiring unit 214 then outputs, to the normalizing unit 220, positional information indicating the acquired position of the master-side zoom lens 510.

The focus lens position acquiring unit 215 acquires the position of the master-side focus lens 520. Specifically, upon receipt of a movement commanding signal, the focus lens position acquiring unit 215 acquires the position of the master-side focus lens 520 according to a control signal from the master-side focus lens controller 250. The focus lens position acquiring unit 215 then outputs, to the normalizing unit 220, positional information indicating the acquired position of the master-side focus lens 520.

The autofocus module 213 described above is an example of the focus controller according to an embodiment of the present disclosure.

Figure 3:
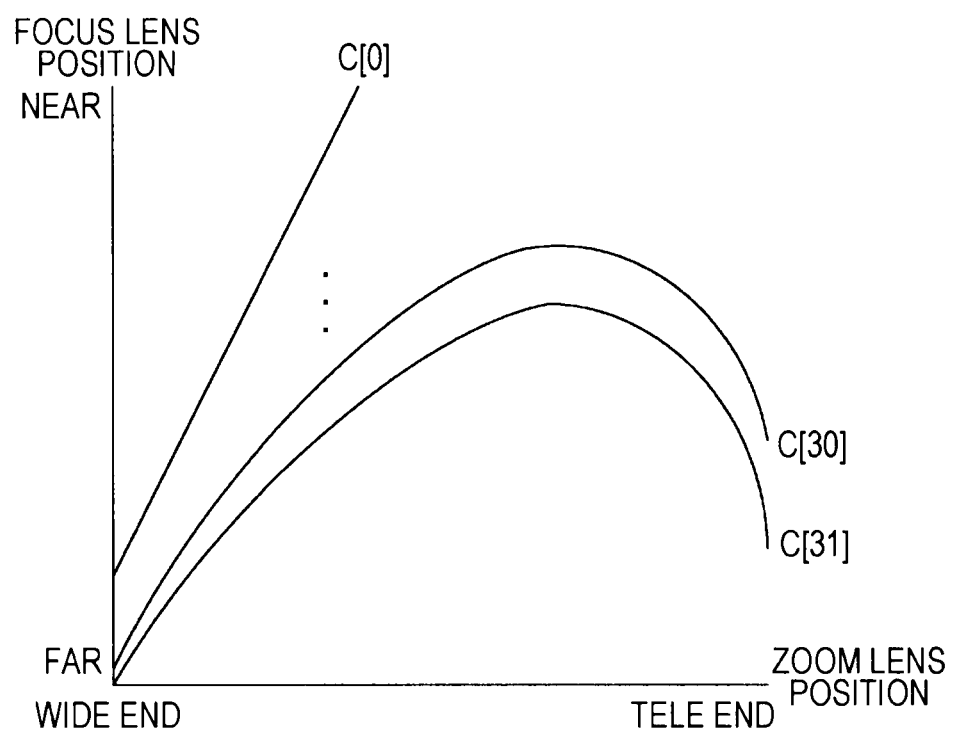
FIG. 3 is a graph illustrating exemplary reference cam curves in the embodiment.

FIG. 3 is a graph illustrating exemplary reference cam curves in this embodiment. In FIG. 3, the vertical axis indicates the position of the focus lens and horizontal axis indicates the position of the zoom lens. The larger the value of the focus lens position on the vertical axis is, the closer to the subject (near) the focus lens is. The smaller the value of the focus lens position on the vertical axis is, the closer to the imaging device 211 (far) the focus lens is. The left end of the horizontal axis is the wide end, that is, on the wide-angle side, and the right end is the tele-side, that is, on the telescopic side.

The solid curves are designed curves, that is, reference cam curves, each of which indicates a relationship between the position of the focus lens and the position of the zoom in a state in which a focus is obtained at a focal length. For example, 32 reference cam curves, C[0] to C[31] in a state in which a focus is obtained at 32 different focal lengths are stored in the cam curve storage unit 230. An index of C[0] to C[31] is a number identifying a reference cam curve. The shorter the focus length is, the smaller the assigned number is. For example, the reference cam curve with a focal length of 0.01 m is C[0], and the reference cam curve with a focal length of 2 m is C[30].

Figure 4:
FIG. 4 is an example of information stored in a can curve storage unit in the embodiment.

FIG. 4 is an example of information stored in the cam curve storage unit 230 in this embodiment. The cam curve storage unit 230 stores information indicating a plurality of zoom lens positions and a plurality of focus lens positions for each cam curve number.

The cam curve number identifies a reference cam curve. The zoom lens position indicates a zoom lens position on the reference cam curve identified by the relevant cam curve number. The focus lens position indicates a focus lens position on the reference cam curve identified by the relevant cam curve number. When the cam curve number is i (i is an integer from 0 to 31), for example, the zoom lens position Pz[i] [j] (j is an integer from 0 to 255) and the focus lens position Pf[i] [j] are stored.

Figure 5:
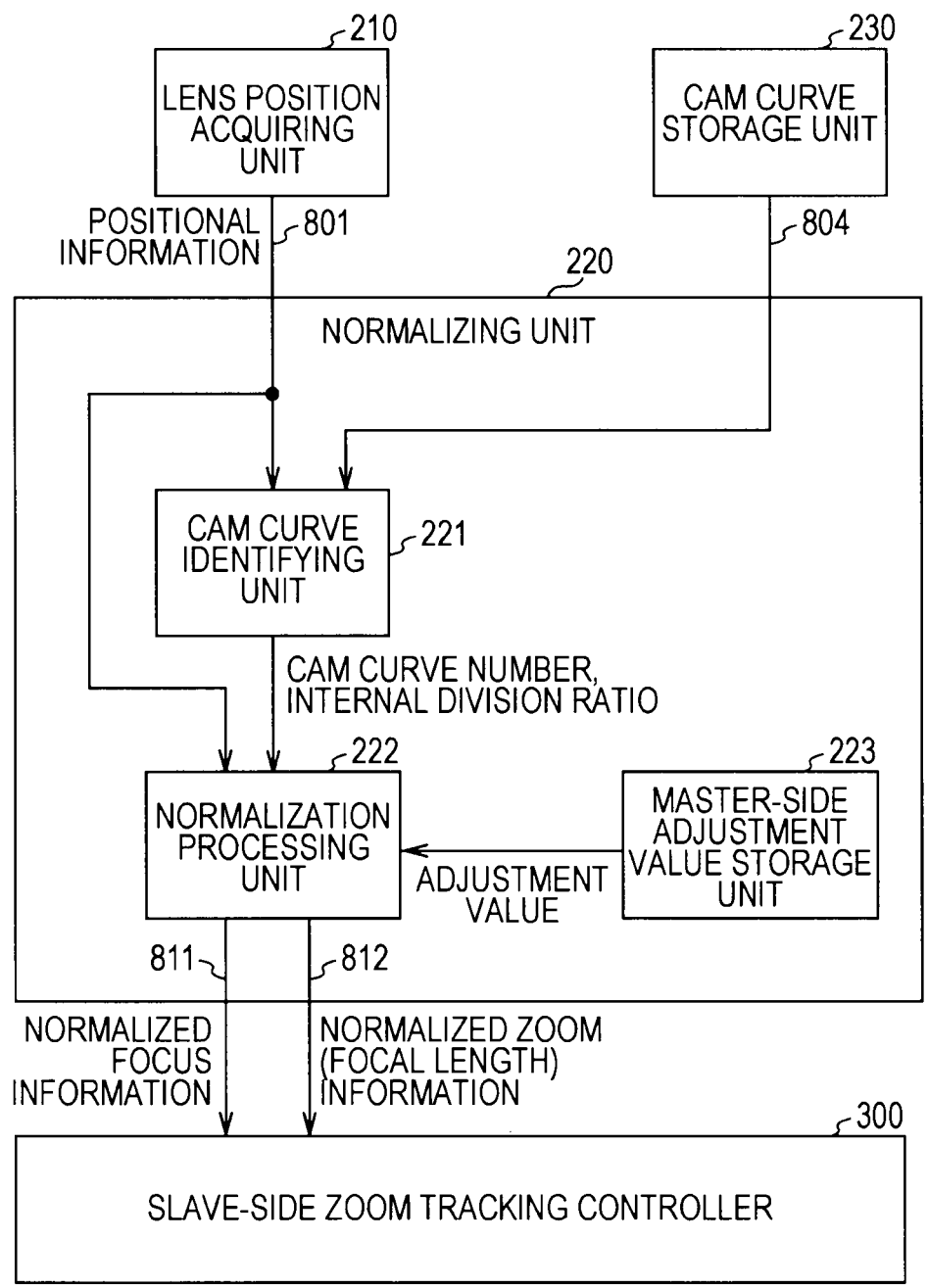
FIG. 5 is a block diagram of a normalizing unit in the embodiment.

FIG. 5 is a block diagram of the normalizing unit 220 in this embodiment. The normalizing unit 220 includes a cam curve indentifying unit 221, a normalization processing unit 222, and a master-side adjustment value storage unit 223.

The cam curve indentifying unit 221 identifies one of the reference cam curves according to the positions indicated in the positional information. For example, the cam curve identifying unit 221 identifies a reference cam curve according to the smallest minimum distance among the points in the positional information and the reference cam curves. In this case, the cam curve identifying unit 221 references the reference cam curves stored in the cam curve storage unit 230 and compares the minimum distances among the positions in the positional information and the reference cam curves.

The reference cam curve is identified by the cam curve number and the internal division ratio. The internal division ratio is a ratio at which a line segment connecting two of the intersections of a perpendicular drawn from a point on the horizontal axis and the reference cam curves is internally divided.

If the smallest minimum distance is less than a threshold in the comparison of the minimum distances among the reference cam curves to which cam curve numbers have been assigned and the points indicated in the positional information, the cam curve identifying unit 221 identifies a reference cam curve from a cam curve number alone. Specifically, the cam curve identifying unit 221 acquires the cam curve number of the reference cam curve producing the smallest minimum distance. If the smallest minimum distance is not less than the threshold, the cam curve identifying unit 221 obtains an internal division ratio at which a reference cam curve producing a minimum distance smaller than the threshold is obtained, and identifies the cam curve from the cam curve number and internal division ratio. The cam curve indentifying unit 221 then outputs the cam curve number or a combination of the cam curve number and internal division ratio to the normalization processing unit 222.

The master-side adjustment value storage unit 223 stores an adjustment value, for each reference cam curve, which indicates a difference between the track of the cam curve specific to the optical system on the master side and the track of the reference cam curve.

The normalization processing unit 222 normalizes the positions indicated in the positional information to a zoom lens position and focus lens position on the identified reference cam curve. Specifically, the normalization processing unit 222 receives positional information from the lens position acquiring unit 210 and also receives the cam curve number and internal division ratio from the cam curve identifying unit 221. The normalization processing unit 222 then reads out the adjustment value corresponding to the cam curve number from the master-side adjustment value storage unit 223, and normalizes the positions indicated in the positional information to positions on the reference cam curve by using the read-out adjustment value. For example, the normalization processing unit 222 subtracts the adjustment value from the zoom lens position indicated in the positional information to normalize it to a zoom lens position on the reference cam curve. When a reference cam curve is identified from the cam curve number and internal division ratio, the normalization processing unit 222 corrects the adjustment value according to the internal division ratio before using the adjustment value. The normalization processing unit 222 creates normalization focus information and normalization zoom (focal length) information and output them to the slave-side zoom tracking controller 300.

Figure 6:
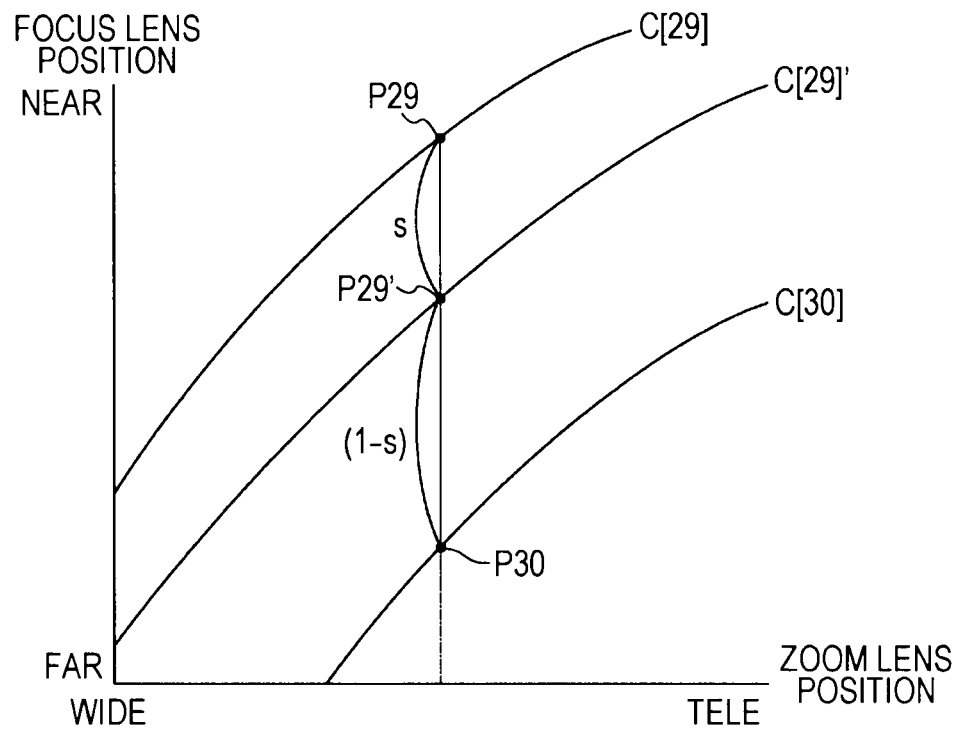
FIG. 6 is a graph illustrating an internal division ratio in the embodiment.

FIG. 6 is a graph illustrating the internal division ratio. In FIG. 6, P29 is the intersection of reference cam curve C[29] and a perpendicular drawn from a zoom lens position, and P30 is the intersection of the perpendicular and reference cam curve C[30]. The internal division ratio is a ratio at which a line segment connecting P29 and P30 is internally divided. P29' is a point at a position obtained by division with an internal division ratio of s. Reference cam curve C[29]' is a cam curve formed by connecting a point on the line segment between reference cam curve C[29] and reference cam curve C[30], the internal division ratio being at that point. As described above, a reference cam curve is defined for each focal length. When a focus is made between focal lengths, zoom tracking control is carried out on a reference cam curve formed according to the internal division ratio. If, for example, the focal length of reference cam curve C[30] is 2 m and the focal length of reference cam curve C[29] is 1 m, then reference cam curve C[29]' formed according to an internal division ratio of 0.5 is a reference cam curve with a focal length of 1.5 m.

FIG. 7 shows exemplary adjustment values on the master side in this embodiment. The master-side adjustment value storage unit 223 stores a master-side zoom lens position adjustment value for each cam curve number. Suppose that reference cam curves C[0] to C[31] have been stored. Then, the cam curve storage unit 230 stores master-side zoom lens position adjustment values Δmz[0] to Δmz[31] in correspondence to C[0] to C[31].

Figure 8:
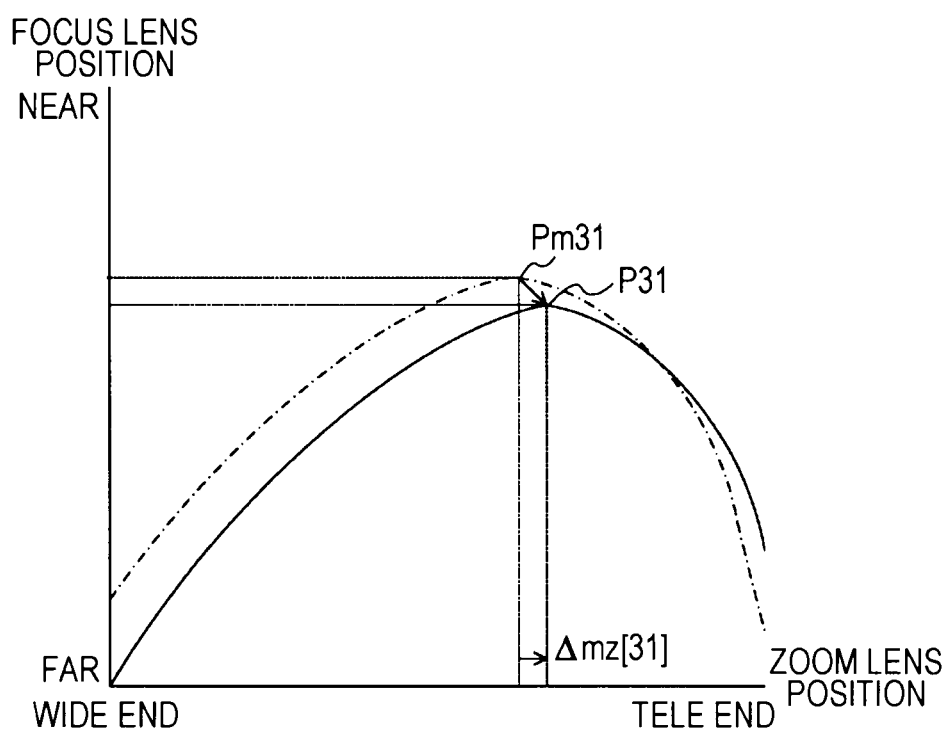
FIG. 8 is a graph illustrating an example of a cam curve on the master side in the embodiment.

An example of a normalization result will be described with reference to FIG. 8. FIG. 8 is a graph illustrating an example of a cam curve on the master side in this embodiment. The solid curve is identified reference cam curve C[31], and the dash-dot curve is cam curve Cm[31] specific to the optical system on the master side. Pm31 is a point at which a focus has been obtained on the master side, that is, a point indicated in the positional information. Δmz[31] is an adjustment value used for the zoom lens position corresponding to reference cam curve C[31]. P31 is a point on a reference cam curve that includes a zoom lens position obtained by subtracting Δmz[31] from zoom lens position Pm31. When the reference cam curve is identified and the zoom lens position is normalized, Pm31 is normalized to P31 on the reference cam curve.

Figure 9:
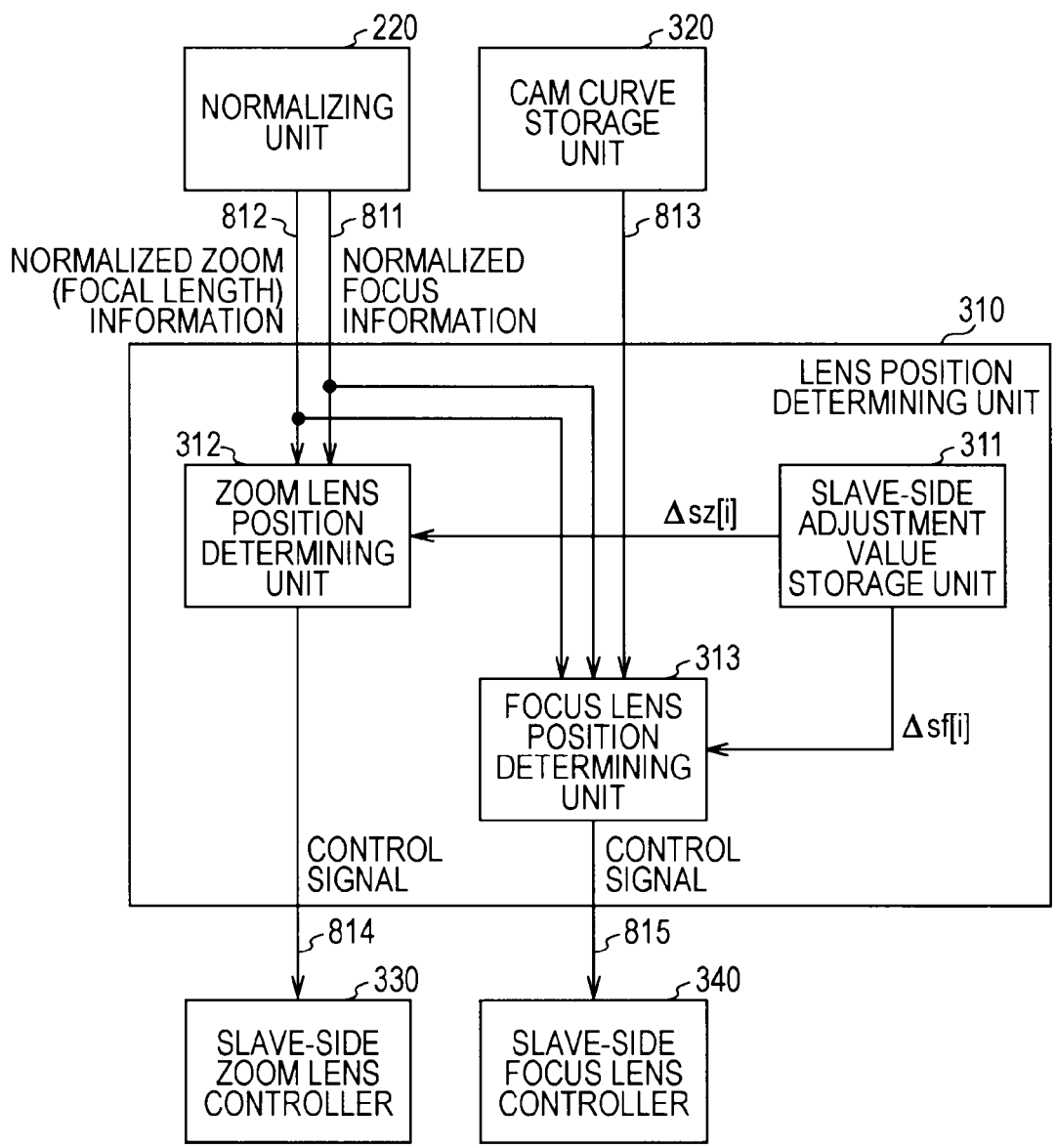
FIG. 9 is a block diagram showing an example of the structure of a lens position determining unit in the embodiment.

FIG. 9 is a block diagram showing an example of the structure of the lens position determining unit 310 in this embodiment. The lens position determining unit 310 includes a slave-side adjustment value storage unit 311, a zoom lens position determining unit 312, and a focus lens position determining unit 313.

The slave-side adjustment value storage unit 311 stores an adjustment value, for each reference cam curve, which indicates a difference between the track of the cam curve specific to the optical system on the slave side and the track of the reference cam curve.

The zoom lens position determining unit 312 determines the position of the slave-side zoom lens 530 on the cam curve specific to the slave side from the normalized zoom lens position. Specifically, the zoom lens position determining unit 312 receives the normalized focus information and normalized zoom (focal length) information from the normalizing unit 220. The zoom lens position determining unit 312 then reads out the adjustment value corresponding to the reference cam curve indicated in the normalized focus information from the slave-side adjustment value storage unit 311, and uses the read-out adjustment value to determine the position of the slave-side zoom lens 530 on the cam curve specific to the slave side from the position indicated in the normalized zoom (focal length) information. For example, the zoom lens position determining unit 312 uses the adjustment value to perform a predetermined calculation for the position indicated in the normalized zoom lens information. Since the normalization that has been carried out by the normalizing unit 220 corresponds to the position determination to be carried out by the lens position determining unit 310, the calculation to be carried out by the lens position determining unit 310 corresponds to the calculation that has been carried out by the normalizing unit 220. If, for example, the normalizing unit 220 has subtracted the adjustment value from the position indicated in the positional information, the lens position determining unit 310 adds the adjustment value to the normalized position. The zoom lens position determining unit 312 outputs, to the slave-side zoom lens controller 330, a control signal that commands the movement of the slave-side zoom lens 530 to the acquired position.

The focus lens position determining unit 313 determines the position of the slave-side focus lens 540 on the cam curve specific to the slave side from the normalized focus lens position. Specifically, the focus lens position determining unit 313 receives the normalized focus information and normalized zoom (focal length) information from the normalizing unit 220. The focus lens position determining unit 313 then acquires the reference cam curve indicated in the normalized focus information from the cam curve storage unit 230 through the communication line 813. The focus lens position determining unit 313 acquires, from the reference cam curve, the focus lens position corresponding to the zoom lens position indicated in normalized zoom (focal length) information. The focus lens position determining unit 313 then reads out the adjustment value corresponding to the reference cam curve indicated in the normalized focus information from the slave-side adjustment value storage unit 311, and uses the read-out adjustment value to determine the position of the slave-side focus lens 540 on the cam curve specific to the slave side from the acquired focus lens position. The focus lens position determining unit 313 outputs, to the slave-side focus lens controller 340, a control signal that commands the movement of the slave-side focus lens 540 to the acquired position. The structure of the lens position determining unit 260 on the master side is identical to the structure of the lens position determining unit 310 on the slave side, except that the zoom lens position and focus lens position on the cam curve specific to the master side are determined.

FIG. 10 shows exemplary adjustment values on the slave side in this embodiment. The slave-side adjustment value storage unit 311 stores a slave-side zoom lens position adjustment value and a slave-side focus lens position adjustment value for each cam curve number. Suppose that reference cam curves C[0] to C[31] have been stored. Then, the slave-side adjustment value storage unit 311 stores slave-side zoom lens position adjustment values $\Delta sz[0]$ to $\Delta sz[31]$ and slave-side focus lens position adjustment values $\Delta sf[0]$ to $\Delta sf[31]$ in correspondence to C[0] to C[31].

Figure 11:
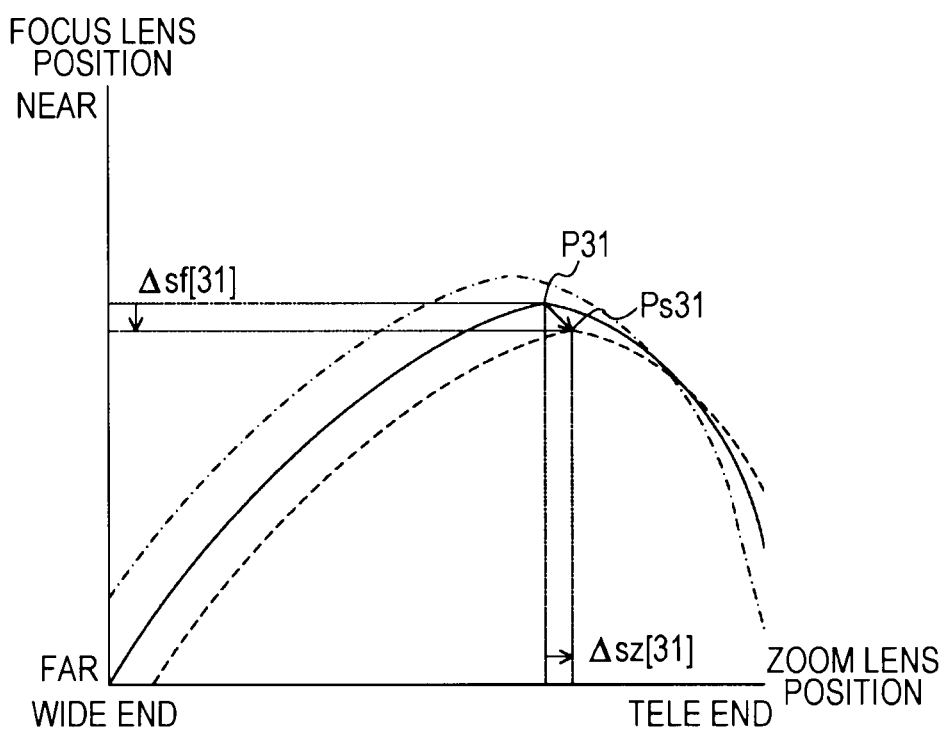
FIG. 11 shows exemplary cam curves on the master side and slave side in the embodiment.

FIG. 11 shows exemplary cam curves on the master side and slave side in this embodiment. The solid curve is reference cam curve C[31] indicated in the normalized focus information, the dash-dot curve is cam curve Cm[31] specific to the optical system on the master side, and the dotted curve is cam curve Cs[31] specific to the optical system on the slave side. P31 is a point on reference cam curve C[31] identified by the normalized zoom (focal length) information and normalized focus information. $\Delta sz[31]$ is an adjustment value used for the zoom lens position corresponding to reference cam curve C[31]. $\Delta sf[31]$ is an adjustment value used for the focus lens position corresponding to reference cam curve C[31]. Ps31 is a point obtained by respectively adding $\Delta sz[31]$ and $\Delta sf[31]$ to the zoom lens position and focus lens position of P31. When these adjustment values are added as shown in FIG. 11, Ps31 on the cam curve on the slave side is obtained from P31.

Figure 12:
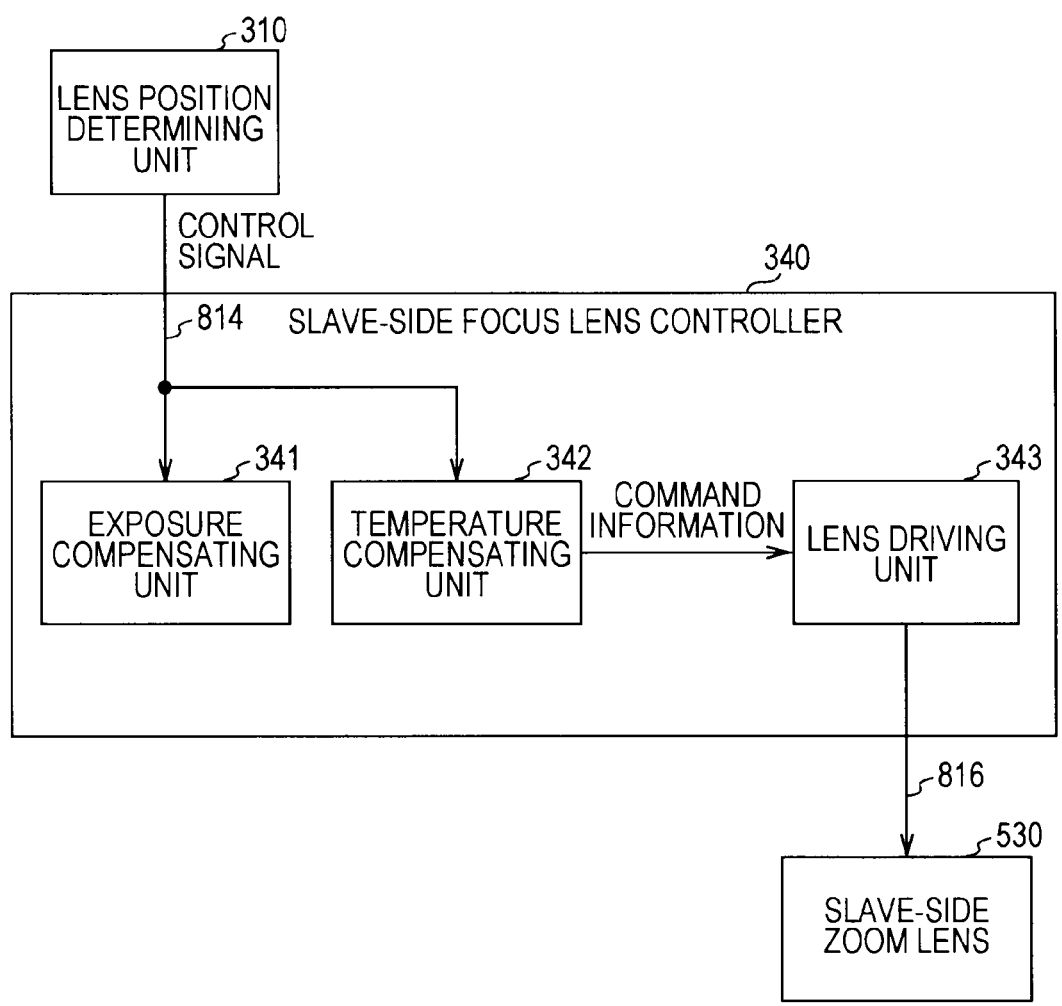
FIG. 12 is a block diagram showing an example of the structure of a slave-side zoom lens controller in the embodiment.

FIG. 12 is a block diagram showing an example of the structure of the slave-side focus lens controller 340 in this embodiment. The slave-side focus lens controller 340 includes an exposure compensating unit 341, a temperature compensating unit 342, and a lens driving unit 343.

The exposure compensating unit 341 compensates an exposure value according to a position commanded by a control signal. Specifically, the exposure compensating unit 341 receives the control signal from the lens position determining unit 310, after which the exposure compensating unit 341 compensates an aperture value or uses a neutral density (ND) filter so that an appropriate exposure is obtained at the position commanded by the control signal.

The temperature compensating unit 342 compensates the position commanded by the control signal, according to the temperature characteristic of the compound-eye imaging apparatus. Specifically, the temperature compensating unit 342 outputs, to the lens driving unit 343, a commanding signal that commands the movement of the slave-side zoom lens 530 to the compensated position.

The lens driving unit 343 moves the slave-side focus lens 540 to the commanded position. Specifically, the lens driving unit 343 receives the commanding signal from the temperature compensating unit 342 and controls a motor, a cam, and the like so as to move the slave-side focus lens 540 to the position commanded by the commanding signal.

The structure of the slave-side zoom lens controller 330 is identical to the structure of the slave-side focus lens controller 340, except that the slave-side zoom lens controller 330 lacks the exposure compensating unit 341. The structure of the master-side zoom lens controller 240 is identical structure of the slave-side zoom lens controller 330, and the structure of the master-side focus lens controller 250 is identical structure of the slave-side focus lens controller 340.

Operations of the Zoom Tracking Controllers

Figure 13:
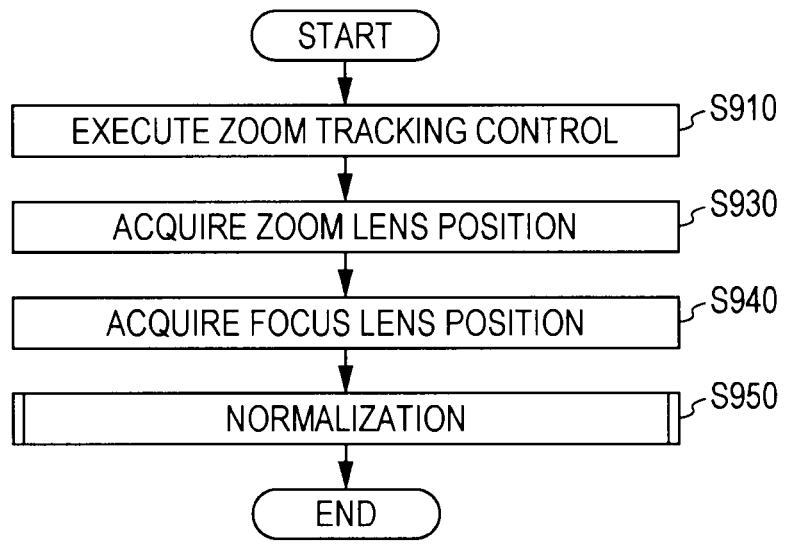
FIG. 13 is a flowchart illustrating an example of the operation of a master-side zoom tracking controller in the embodiment.

Next, the operations of the master-side zoom tracking controller 200 and slave-side zoom tracking controller 300 will be described with reference to FIGS. 13 to 15. FIG. 13 is a flowchart illustrating an example of the operation of the master-side zoom tracking controller 200 in this embodiment. This operation is started when, for example, the zoom factor is changed by a user's manipulation.

The lens position acquiring unit 210 performs zoom tracking control under which the master-side focus lens 520 is moved to a point at which a focus is obtained when the master-side zoom lens 510 is moved (step S910).

The lens position acquiring unit 210 acquires the position of the master-side zoom lens 510 (step S930). The lens position acquiring unit 210 then acquires the position of the master-side focus lens 520 (step S940). The normalizing unit 220 executes a normalizing process to normalize the acquired positions (step S950). Upon the completion of step S950, the master-side zoom tracking controller 200 terminates the operation for zoom tracking control.

Figure 14:
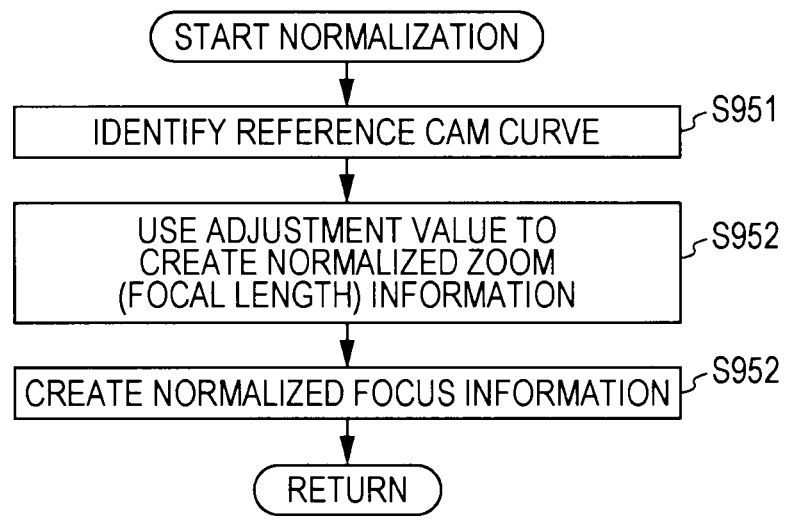
FIG. 14 is a flowchart illustrating an example of a normalizing process in the embodiment.

FIG. 14 is a flowchart illustrating an example of the normalizing process in this embodiment. The normalizing unit 220 identifies a reference cam curve from the acquired positions of the master-side zoom lens 510 and master-side focus lens 520 (step S951).

The normalizing unit 220 uses the adjustment value corresponding to the identified reference cam curve to create normalized zoom (focal length) information (step S952). The normalizing unit 220 then creates normalized focus information indicating the identified reference cam curve (step S953). Upon the completion of step S953, the normalizing unit 220 terminates the normalization process.

Figure 15:
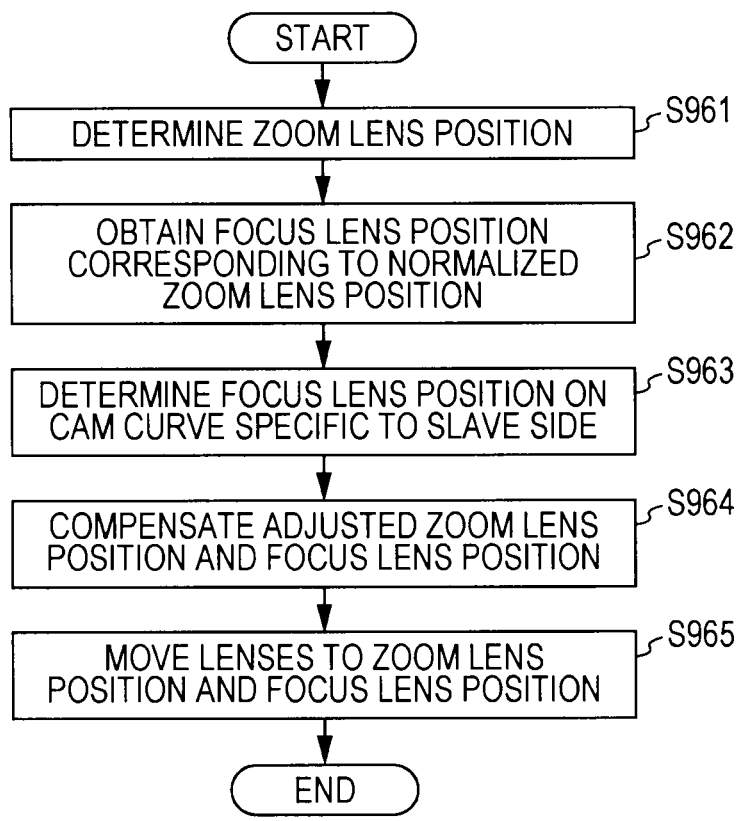
FIG. 15 is a flowchart illustrating an example of the operation of a slave-side zoom tracking controller in the embodiment.

FIG. 15 is a flowchart illustrating an example of the operation of the slave-side zoom tracking controller 300. This operation is started when normalization information is input to the slave-side zoom tracking controller 300. The lens position determining unit 310 uses the adjustment value corresponding to the reference cam curve indicated in the normalized focus information to determine a zoom lens position on the cam curve specific to the slave side from the zoom lens position indicated in the normalized zoom (focal length) information (step S961).

The lens position determining unit 310 obtains the focus lens position on the reference cam curve from the normalized focus information and normalized zoom (focal length) information (step S962). The lens position determining unit 310 then uses the adjustment value corresponding to the reference cam curve to determine the focus lens position on the cam curve specific to the slave side from the obtained focus lens position (step S963).

The slave-side zoom lens controller 330 and slave-side focus lens controller 340 respectively compensate the determined zoom lens position and focus lens position according to the temperature characteristics (step S964). Then, the slave-side zoom lens controller 330 moves the slave-side zoom lens 530 to the compensated zoom lens position, and the slave-side focus lens controller 340 moves the slave-side focus lens 540 to the compensated focus lens position (step S965). Upon the completion of step S965, the slave-side zoom tracking controller 300 terminates the operation for zoom tracking.

Although the compound-eye imaging apparatus 100 uses the inner-focus method, this is not a limitation if the compound-eye imaging apparatus 100 is structured so as to control zoom tracking by controlling the zoom lens and focus lens.

Although one zoom lens and one focus lens have been used, it will be appreciated that a plurality of zoom lenses and a plurality of focus lenses may be used.

The normalizing unit 220 prestores adjustment values and reads out the prestored adjustment values for normalization. However, the normalizing unit 220 may not prestore these adjustment values. For example, the normalizing unit 220 may acquire a position on a reference cam curve corresponding to a focus point from prestored correspondences between points on reference cam curves and points on the cam curve specific to the master side.

The normalizing unit 220 prestores the adjustment values, which are used by the normalizing unit 220 to shift the position of the zoom lens, one for each reference cam curve. The adjustment value may be any value that indicates a difference between the track of the cam curve specific to the master side and the track of the reference cam curve, so the number of adjustment values for each reference cam curve is not limited to one. If, for example, a cam curve track is represented by a polynomial equation, an adjustment value may be a difference in a coefficient in each term between polynomial equations.

Although the normalizing unit 220 outputs the normalized zoom lens position and identified reference cam curve to the lens position determining unit 310, the normalizing unit 220 may output the normalized zoom lens position and normalized focus lens position to the lens position determining unit 310. The normalizing unit 220 may also output the normalized focus lens position and identified reference cam curve to the lens position determining unit 310. In this case, adjustment values to determine the focus lens position are stored in the master-side adjustment value storage unit 223.

Although the cam curve storage unit 230 prestores the coordinates of points on the reference cam curves, it is not a limitation; the cam curve storage unit 230 may prestore any type of information if the reference cam curves can be acquired from the information. For example, the cam curve storage unit 230 may store, for each reference cam curve, the coefficient of each term in a polynomial equation from which the reference cam curve is acquired.

As described above, according to this embodiment of the present disclosure, the normalizing unit 220 normalizes the positions of the master-side zoom lens 510 and master-side focus lens 520 for which a focus has been obtained to the zoom lens position and focus lens position on a reference cam curve. The lens position determining unit 310 then determines positions on the cam curve specific to the slave side from the normalized positions. The slave-side zoom lens controller 330 and slave-side focus lens controller 340 respectively move the slave-side zoom lens 530 and slave-side focus lens 540 to the determined positions. Since this structure enables the position when a focus has been obtained on the master side to be normalized to a position on a reference cam curve, even if a match is not obtained between the track of the cam curve specific to the master side and the track of the cam curve specific to the slave side as shown in FIG. 11, it becomes possible to prevent the focus on the slave side from being displaced. Accordingly, the compound-eye imaging apparatus 100 can easily carry out accurate zoom tracking control.

The normalizing unit 220 prestores a difference between the track of the cam curve specific to the master side and the track of each reference cam curve as an adjustment value, and reads out the adjustment value corresponding to an identified reference cam curve for normalization. Therefore, the normalizing unit 220 does not prestore points on the cam curve specific to the master side.

The normalizing unit 220 creates normalized zoom (focal length) information and normalized focus information. Since the normalized focus lens position is determined from a reference cam curve and the normalized zoom lens position, the normalizing unit 220 does not output the normalized focus lens position to the lens position determining unit 310.

The zoom lens controllers such as the slave-side zoom lens controller 330 compensate an indicated position according to the temperature characteristics of the compound-eye imaging apparatus 100. Accordingly, the compound-eye imaging apparatus 100 can carry out accurate zoom tracking control even if the temperature in the environment changes.

The master-side zoom lens controller 240 and slave-side zoom lens controller 330 compensate an aperture value and the like according to the zoom lens position, so an exposure value is appropriately compensated.

The autofocus module 213 moves the master-side focus lens 520 to a position at which a focus is obtained according to image analysis results, eliminating the user's burden of manually obtaining a focus.

2. Another Embodiment

Structure of a Compound-Eye Imaging Apparatus

Next, a compound-eye imaging apparatus in another embodiment of the present disclosure will be described with reference to FIGS. 16 and 17. A master-side zoom tracking controller in this embodiment includes a lens position acquiring unit 216, a master-side compensation lens 515, and a master-side compensation lens controller 260, instead of the lens position acquiring unit 210. A slave-side zoom tracking controller in this embodiment further includes a slave-side compensation lens and a slave-side compensation lens controller, which are equivalent to the master-side compensation lens 515 and master-side compensation lens controller 260.

The master-side compensation lens 515 compensates the inclination of a cam curve. The master-side compensation lens 515 is also referred to as a compensator lens. If the ratio of an amount by which the focus lens moves to an amount by which the zoom lens moves is large, that is, the inclination of the cam curve is large, focus control may not follow the fast movement of the zoom lens. As a result, the focus point may be displaced. The master-side compensation lens 515 compensates the inclination of the cam curve to assure a correct focus point.

Figure 16:
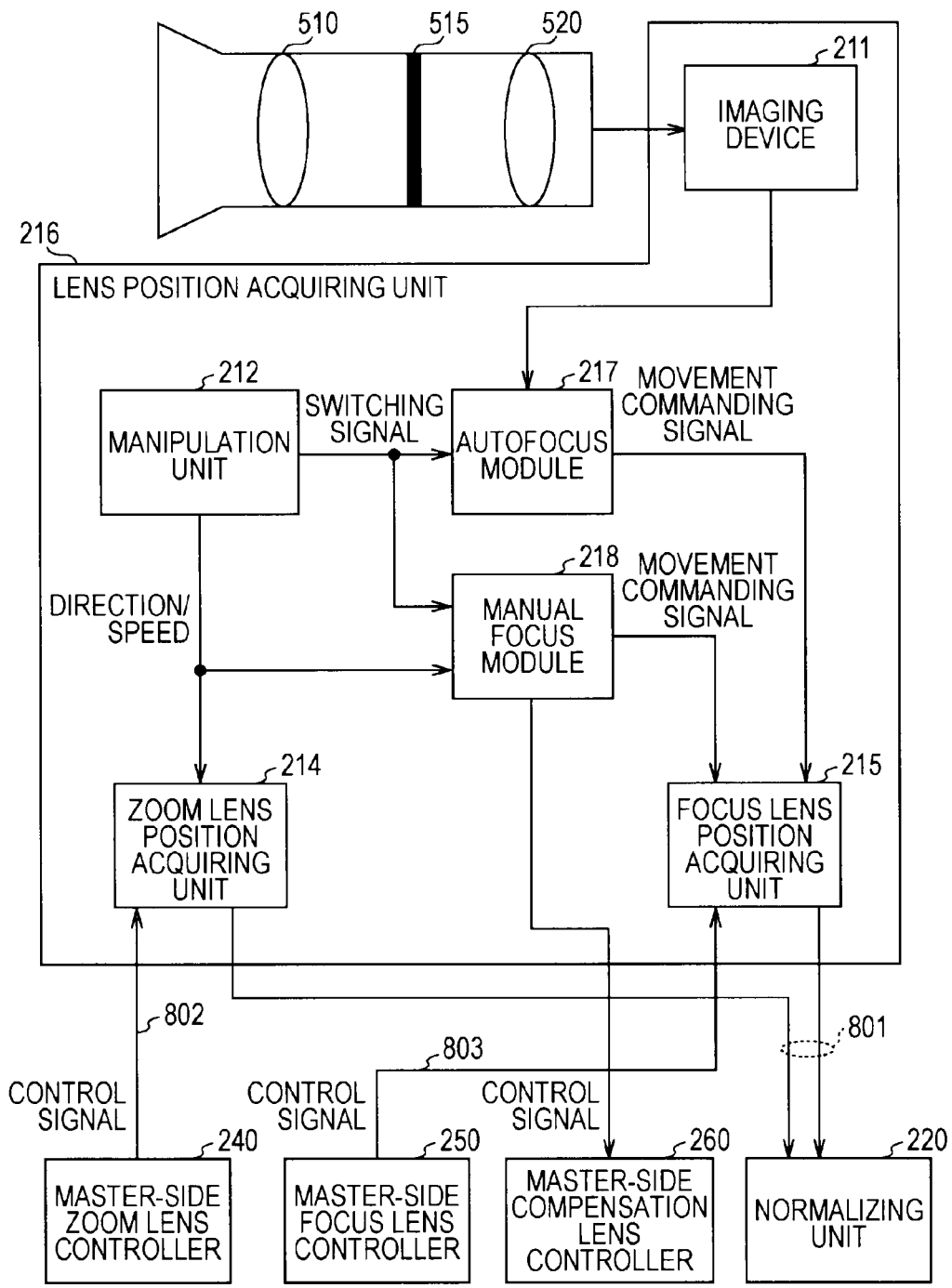
FIG. 16 is a block diagram showing an example of the structure of a lens position acquiring unit in another embodiment of the present disclosure.

FIG. 16 is a block diagram showing an example of the structure of the lens position acquiring unit 216 in this embodiment. The lens position acquiring unit 216 differs from the lens position acquiring unit 210 in the embodiment described earlier in that an auto focus module 217 is provided instead of the autofocus module 213.

When the master-side zoom lens 510 moves, the autofocus module 217 moves the master-side focus lens 520 and master-side compensation lens 515 according to a cam curve the inclination of which has been compensated. Specifically, the autofocus module 217 outputs, to the master-side focus lens controller 250 and master-side compensation lens controller 260, a control signal that indicates positions of the movement destinations.

The master-side compensation lens controller 260 moves the master-side compensation lens 515 to the position indicated by the control signal.

Figure 17:
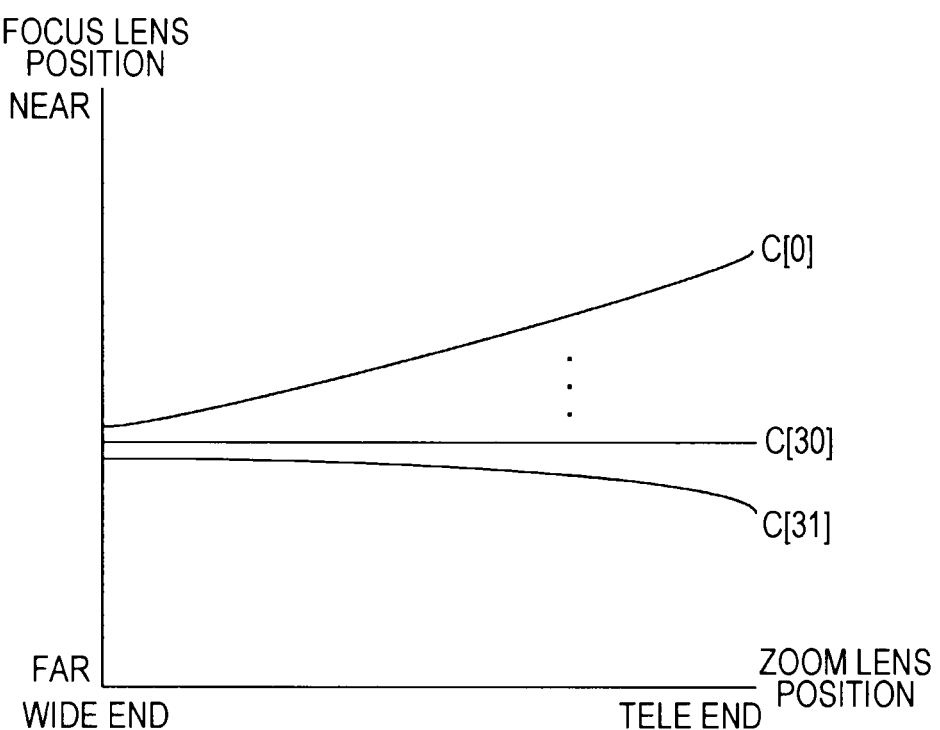
FIG. 17 is a graph illustrating exemplary reference cam curves in the other embodiment.

FIG. 17 is a graph illustrating exemplary reference cam curves in this embodiment. As shown in FIG. 17, due to control by the master-side compensation lens 515, the inclination of each reference cam curve is made smaller than when the master-side compensation lens 515 is not provided. This reduces an amount by which the focus lens moves when the zoom lens moves. Even if the zoom lens moves fast, therefore, the autofocus module 217 can carry out accurate zoom tracking control.

As described above, according to this embodiment, the inclination of the cam curve is reduced due to control by the master-side compensation lens 515. Even if the zoom lens moves fast, therefore, the compound-eye imaging apparatus 100 can carry out accurate zoom tracking control.

The embodiments of the present disclosure are just examples that embody the present disclosure. As clarified in the embodiments of the present disclosure, there is correspondence between matters in the embodiments of the present disclosure and the disclosure identifying matters in the scope of the appended claims. Similarly, there is correspondence between the disclosure identifying matters in the scope of the appended claims and the matters in the embodiments of the present disclosure that have the same names as the disclosure identifying matters. However, the present disclosure is not limited to these embodiments but can be embodied by varying the embodiments in a number of ways without departing from the spirit and scope of the present disclosure.

The processing procedures described in an embodiment of the present disclosure may be considered as methods having a series of steps or as a program that causes a computer to execute the series of steps or a recording medium that stores the program. Examples of the recording medium includes a compact disc (CD), a mini-disc (MD), a digital versatile disk (DVD), a memory card, and Blu-ray Disc™, for example.

The present disclosure contains subject matter related to that disclosed in Japanese Priority Patent Application JP 2011-000464 filed in the Japan Patent Office on Jan. 5, 2011, the entire contents of which are hereby incorporated by reference.

What is claimed is:
1. A zoom tracking controller, comprising:
a first zoom lens;
a first focus lens;
a second zoom lens;
a second focus lens;
a lens position acquiring unit that acquires the position of the first zoom lens and the position of the first focus lens;
a cam curve storage unit that stores at least one predetermined reference cam curve that represents a relationship among focused zoom lens positions and focus lens positions;
a normalizing unit that carries out a normalizing process by which the acquired first zoom lens position and the acquired first focus lens position are normalized to a zoom lens position and a focus lens position on one of at least one reference cam curve according to a first cam curve, which is specific to the first zoom lens and the first focus lens, and to the reference cam curve;
a focused lens position determining unit that determines the position of the second zoom lens and the position of the second focus lens on a second cam curve, which is a cam curve specific to the second zoom lens and the second focus lens, from the normalized zoom lens position and the normalized focus lens position according to the second cam curve and the reference cam curve; and
a lens controller that respectively moves the second zoom lens and the second focus lens to the determined second zoom lens position and the determined second focus lens position.

2. The zoom tracking controller according to claim 1, wherein the normalizing unit includes
- a cam curve identifying unit that identifies one of the at least one reference cam curve according to the determined position of the first zoom lens and the determined position of the first focus lens,
- an adjustment value storage unit that stores an adjustment value, which indicates a difference between a track of the first cam curve and a track of each of the at least one reference cam curve, and
- a normalization processing unit that carries out the normalizing process by using the adjustment value corresponding to the identified reference cam curve.

3. The zoom tracking controller according to claim 1, wherein:
- the normalization processing unit creates normalizing zoom information that indicates the normalized zoom lens position and normalized cam curve information that indicates the identified reference cam curve; and
- the focused lens position determining unit adjusts the zoom lens position indicated in the normalized zoom information and the focus lens position corresponding to the zoom lens position indicted in the normalized zoom information on the reference cam curve indicated in the normalized cam curve information.

4. The zoom tracking controller according to claim 1, wherein the lens controller include
- a temperature compensating unit that compensates the determined second zoom lens position and the determined second focus lens position according to temperature characteristic of a compound-eye imaging apparatus to which the second zoom lens and the second focus lens are attached, and
- a lens driving unit that moves the second zoom lens to the compensated second zoom lens position and also moves the second focus lens to the compensated second focus lens position.

5. The zoom tracking controller according to claim 4, wherein the lens controller further includes an exposure compensating unit that compensates an exposure value according to the determined second zoom lens position.

6. The zoom tracking controller according to claim 1, further comprising:
- a manipulation unit that changes the first zoom lens position according to a manipulation carried out by a user; and
- a focus controller that, if the first zoom lens position is changed, analyzes an image formed by the first focus lens, and moves the first focus lens to a position at which the first focus lens is focused with the first zoom lens positioned at the changed position;
- wherein the lens position acquiring unit acquires positions to which the first zoom lens and the first focus lens have been moved by the focus controller.

7. The zoom tracking controller according to claim 6, wherein the focus controller moves the first zoom lens and a lens, used as a compensation lens, which compensates the amount of movement of the first focus lens with respect to the amount of movement of the first zoom lens on the first cam curve.

8. A compound-eye imaging apparatus, comprising:
- a first zoom lens;
- a first focus lens;
- a second zoom lens;
- a second focus lens;
- a lens position acquiring unit that acquires the position of the first zoom lens and the position of the first focus lens;
- a cam curve storage unit that stores at least one predetermined reference cam curve that represents a relationship among focused zoom lens positions and focus lens positions;
- a normalizing unit that carries out a normalizing process by which the acquired first zoom lens position and the acquired first focus lens position are normalized to a zoom lens position and a focus lens position on one of at least one reference cam curve according to a first cam curve, which is specific to the first zoom lens and the first focus lens, and to the reference cam curve;
- a focused lens position determining unit that determines the position of the second zoom lens and the position of the second focus lens on a second cam curve, which is a cam curve specific to the second zoom lens and the second focus lens, from the normalized zoom lens position and the normalized focus lens position according to the second cam curve and the reference cam curve; and
- a lens controller that respectively moves the second zoom lens and the second focus lens to the determined second zoom lens position and the determined second focus lens position.

9. A method of control by a zoom tracking controller, comprising;
- a lens position acquiring procedure by which a lens position acquiring unit acquires the position of the first zoom lens and the position of the first focus lens;
- a normalization procedure by which a normalizing process is executed to normalize the acquired first zoom lens position and the acquired first focus lens position to a zoom lens position and a focus lens position on one of at least one predetermined reference cam curve according to a first cam curve, which is specific to the first zoom lens and the first focus lens, and to the predetermined reference cam curve, the at least one predetermined reference cam curve representing a relationship among focused zoom lens positions and focus lens positions;
- a focused lens position determining procedure by which the position of the second zoom lens and the position of the second focus lens on a second cam curve, which is a cam curve specific to the second zoom lens and the second focus lens, are determined from the normalized zoom lens position and the normalized focus lens position according to the second cam curve and the reference cam curve; and
- a lens control procedure by which the second zoom lens and the second focus lens are respectively moved to the determined second zoom lens position and the determined second focus lens position.

* * * * *